(12) United States Patent
Wang et al.

(10) Patent No.: US 11,294,220 B2
(45) Date of Patent: Apr. 5, 2022

(54) DISPLAY PANEL AND METHOD FOR MANUFACTURING SAME, AND DISPLAY DEVICE

(71) Applicant: BOE Technology Group Co., Ltd., Beijing (CN)

(72) Inventors: Xin Wang, Beijing (CN); Jianhua Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/640,809

(22) PCT Filed: Jun. 28, 2019

(86) PCT No.: PCT/CN2019/093661
§ 371 (c)(1),
(2) Date: Feb. 21, 2020

(87) PCT Pub. No.: WO2020/001612
PCT Pub. Date: Jan. 2, 2020

(65) Prior Publication Data
US 2021/0124109 A1 Apr. 29, 2021

(30) Foreign Application Priority Data
Jun. 29, 2018 (CN) .......................... 201810696705.X

(51) Int. Cl.
*F21V 8/00* (2006.01)
*G02F 1/1335* (2006.01)

(52) U.S. Cl.
CPC ..... *G02F 1/133514* (2013.01); *G02B 6/0041* (2013.01); *G02B 6/0065* (2013.01);
(Continued)

(58) Field of Classification Search
None
See application file for complete search history.

(56) References Cited

U.S. PATENT DOCUMENTS

2002/0176036 A1* 11/2002 Kaneko ............ G02F 1/133615
349/65
2006/0153511 A1 7/2006 Franklin et al.
(Continued)

FOREIGN PATENT DOCUMENTS

CN 1588132 A 3/2005
CN 1661437 A * 8/2005
(Continued)

OTHER PUBLICATIONS

English translation of CN-101349823-B, Title: Vertical orientation mode liquid crystal display device and its manufacture method, Author: Zaiguang Jin ; Date of publication:May 30, 2012 (Year: 2012).*
(Continued)

*Primary Examiner* — Shan Liu
(74) *Attorney, Agent, or Firm* — Fay Sharpe LLP

(57) ABSTRACT

Provided is a display panel including a diffusion particle layer as well as a color filtering layer and a liquid crystal layer which are stacked on the diffusion particle layer. The diffusion particle layer includes a transparent medium layer and photosensitive polymeric monomers doped in the transparent medium layer, and a side surface of the transparent medium layer is a light incident surface. The photosensitive polymeric monomers are subjected to a polymerization reaction under an action of light incident from the light incident surface into the transparent medium layer, and the photosensitive polymeric monomers subjected to the polymerization reaction are configured to scatter the light.

11 Claims, 7 Drawing Sheets

(52) U.S. Cl.
CPC ..... *G02B 6/0068* (2013.01); *G02F 1/133504* (2013.01); *G02F 1/133528* (2013.01)

(56) References Cited

U.S. PATENT DOCUMENTS

| | | | | |
|---|---|---|---|---|
| 2007/0202273 | A1* | 8/2007 | Hirai | G02B 5/3025 |
| | | | | 428/1.31 |
| 2008/0049317 | A1* | 2/2008 | Hara | G02B 5/0242 |
| | | | | 359/487.02 |
| 2010/0284170 | A1 | 11/2010 | Awaji et al. | |
| 2012/0008212 | A1 | 1/2012 | Wang et al. | |
| 2012/0113672 | A1* | 5/2012 | Dubrow | G02B 6/0073 |
| | | | | 362/602 |
| 2015/0331171 | A1* | 11/2015 | Jia | G02B 6/009 |
| | | | | 362/609 |
| 2016/0306215 | A1* | 10/2016 | Chen | G02F 1/13362 |
| 2017/0165947 | A1 | 6/2017 | Murakami et al. | |
| 2017/0219876 | A1 | 8/2017 | Lu | |
| 2017/0261778 | A1 | 9/2017 | Lan et al. | |
| 2018/0047943 | A1 | 2/2018 | Hu | |
| 2018/0059448 | A1 | 3/2018 | Wang et al. | |
| 2018/0275452 | A1 | 9/2018 | Wang et al. | |
| 2019/0384110 | A1* | 12/2019 | Tanaka | H01L 27/3211 |

FOREIGN PATENT DOCUMENTS

| | | | |
|---|---|---|---|
| CN | 1703636 | A | 11/2005 |
| CN | 101349823 | A | 1/2009 |
| CN | 101802655 | A | 8/2010 |
| CN | 101889219 | A | 11/2010 |
| CN | 102230977 | A | 11/2011 |
| CN | 101349823 | B * | 5/2012 |
| CN | 102702713 | A | 10/2012 |
| CN | 203453947 | U | 2/2014 |
| CN | 104204867 | A | 12/2014 |
| CN | 105204216 | A | 12/2015 |
| CN | 105467698 | A | 4/2016 |
| CN | 105549282 | A | 5/2016 |
| CN | 205374931 | U | 7/2016 |
| CN | 205374931 | U * | 7/2016 |
| CN | 106292030 | A | 1/2017 |
| CN | 106647049 | A | 5/2017 |
| CN | 107402416 | A | 11/2017 |
| CN | 108803126 | A | 11/2018 |
| WO | WO2015079897 | A1 | 6/2015 |

OTHER PUBLICATIONS

English translation of CN-205374931-U, Title: Transparent display based on LED backlight, Author: Zhang Lei; Sun Xiaolin ; Date of publication:Jul. 6, 2016 (Year: 2016).*
English translation of CN-1661437-A; Title: Backlight Module and Light Guide Plate Thereof, Author: Zheng, Wen-feng; Chen, Jie-liang; Date of publication: Aug. 31, 2005 (Year: 2005).*
First office action of Chinese application No. 201810696705.X dated Mar. 4, 2020.
International Search report dated Nov. 13, 2019 from PCT/CN2019/093661.

* cited by examiner

DISPLAY PANEL AND METHOD FOR MANUFACTURING SAME, AND DISPLAY DEVICE

The present application is a 371 of PCT Application No. PCT/CN2019/093661, filed Jun. 28, 2019, which claims priority to Chinese Patent Application No. 201810696705.X, filed Jun. 29, 2018 and entitled "DISPLAY PANEL AND METHOD FOR MANUFACTURING SAME, AND DISPLAY DEVICE", the contents of which are incorporated herein by reference in their entirety.

TECHNICAL FIELD

The present disclosure relates to the field of display technologies, and more particularly to a display panel and a method for manufacturing same, and a display device.

BACKGROUND

Display panels are devices having a display function.

A display panel includes a liquid crystal display (LCD) panel, a backlight source and other structures. The backlight source includes a light guide plate, a diffusion sheet located on a light emission surface of the light guide plate, and a light source located at a side surface of the light guide plate. Light emitted by the light source, after being reflected by netted dots which are located on one surface of the light guide plate away from the diffusion sheet, travels towards the diffusion sheet, and then is diffused by the diffusion sheet and emitted out.

SUMMARY

The present disclosure provides a display panel and a method for manufacturing same, and a display device. The technical solutions are as follows:

In one aspect, a display panel is provided. The display panel includes a diffusion particle layer as well as a color filtering layer and a liquid crystal layer which are stacked on the diffusion particle layer, wherein the diffusion particle layer includes a transparent medium layer and photosensitive polymeric monomers doped in the transparent medium layer; one side surface other than two largest surfaces of the transparent medium layer is a light incident surface; and the photosensitive polymeric monomers are subjected to a polymerization reaction under an action of light incident from the light incident surface into the transparent medium layer, and the photosensitive polymeric monomers subjected to the polymerization reaction are configured to scatter the light.

Optionally, a material of the photosensitive polymeric monomers includes any one selected from a group consisting of a salicylate material, a benzophenone material, a benzotriazole material, a substituted-acrylonitrile material, a triazine material, and a hindered-amine material.

Optionally, a density of the photosensitive polymeric monomers at any position of the diffusion particle layer is positively correlated with a distance between the position and the light incident surface.

Optionally, the display panel has a plurality of sub-pixel regions arranged in an array; the color filtering layer includes a plurality of color filtering blocks located within the plurality of sub-pixel regions with a one-to-one correspondence; each of the color filtering blocks has a groove; and the liquid crystal layer includes liquid crystal located in the groove.

Optionally, any two adjacent color filtering blocks are abutted against each other.

Optionally, the color filtering layer is located between the diffusion particle layer and the liquid crystal layer;

or, the color filtering layer is located on a surface of the liquid crystal layer away from the diffusion particle layer.

Optionally, a material of the color filtering layer includes resin.

Optionally, the display panel includes two polarizers, wherein the liquid crystal layer and the diffusion particle layer are located between the two polarizers.

Optionally, the display panel is a normally-transparent display panel.

Optionally, a material of the transparent medium layer includes polymethyl methacrylate or polyimide.

Optionally, the display panel includes an array substrate configured to control the liquid crystal layer.

Optionally, the photosensitive polymeric monomers includes any one selected from a group consisting of a salicylate material, a benzophenone material, a benzotriazole material, a substituted-acrylonitrile material, a triazine material, and a hindered-amine material;

a density of the photosensitive polymeric monomers at any position of the diffusion particle layer is positively correlated with a distance between the position and the light incident surface;

the display panel has a plurality of sub-pixel regions arranged in an array, the color filtering layer includes a plurality of color filtering blocks located within the plurality of sub-pixel regions with a one-to-one correspondence, each of the color filtering blocks has a groove, and the liquid crystal layer includes liquid crystal located in the groove;

any two adjacent color filtering blocks are abutted against each other;

the color filtering layer is located between the diffusion particle layer and the liquid crystal layer, or, the color filtering layer is located on a surface of the liquid crystal layer away from the diffusion particle layer;

a material of the color filtering layer includes resin;

the display panel includes two polarizers, and the liquid crystal layer and the diffusion particle layer are located between the two polarizers;

the display panel is a normally-transparent display panel; and a material of the transparent medium layer includes polymethyl methacrylate or polyimide;

the display panel includes an array substrate configured to control the liquid crystal layer.

In another aspect, the display device includes the display panel of the first aspect and a light source located at one side surface of the transparent medium layer of the display panel.

Optionally, the light source includes a plurality of light-emitting diodes; and each of the light-emitting diodes includes a red light-emitting unit, a green light-emitting unit, and a blue light-emitting unit.

In another aspect, a method for manufacturing a display panel is provided. The method includes:

providing a diffusion particle layer, wherein the diffusion particle layer includes a transparent medium layer and photosensitive polymeric monomers doped in the transparent medium layer, and a side surface of the transparent medium layer is a light incident surface; and stacking a color filtering layer and a liquid crystal layer on the diffusion particle layer, wherein the photosensitive polymeric monomers are subjected to a polymerization reaction under an action of light incident from the light incident surface into the transparent medium layer, and the photosensitive polymeric monomers subjected to the polymerization reaction are configured to scatter the light.

BRIEF DESCRIPTION OF THE DRAWINGS

In order to describe the technical solutions in the embodiments of the present disclosure more clearly, a brief introduction is made on the accompanying drawings required for describing the embodiments. Apparently, the accompanying drawings described below show merely some embodiments of the present disclosure, and a person of ordinary skill in the art may also derive other drawings from these accompanying drawings without creative efforts.

DETAILED DESCRIPTION

Some embodiments of the present disclosure will be described with reference to the accompanying drawings.

Figure 1:
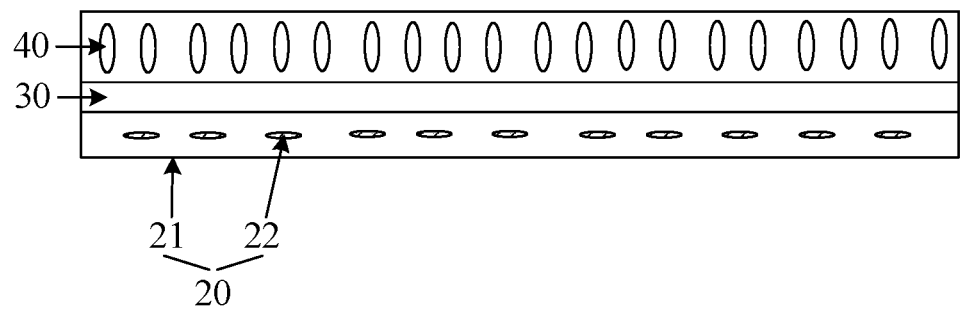
FIG. 1 shows a schematic structural diagram of a display panel provided by an embodiment of the present disclosure.

Referring to FIG. 1 which shows a schematic structural diagram of a display panel provided by an embodiment of the present disclosure, the display panel may include a diffusion particle layer 20 as well as a color filtering layer 30 and a liquid crystal layer 40 which are stacked on the diffusion particle layer 20.

The diffusion particle layer 20 includes a transparent medium layer 21 and photosensitive polymeric monomers 22 doped in the transparent medium layer 21; and a side surface of the transparent medium layer 21 (the side surface refers to a surface of the diffusion particle layer 20 other than the two largest surfaces thereof (the two largest surfaces refer to the top surface and the bottom surface of the transparent medium layer 21 shown in FIG. 1) is a light incident surface.

The photosensitive polymeric monomers 22 are subjected to a polymerization reaction under an action of light incident from the light incident surface into the transparent medium layer 21, and the photosensitive polymeric monomers 22 subjected to the polymerization reaction are configured to scatter the light.

In the embodiments of the present disclosure, the transparent medium layer 21 can guide the light incident from at least one side surface of the diffusion particle layer 20. Without meeting photosensitive polymeric monomers 22, light would be totally reflected by the top surface and bottom surface of the transparent medium layer 21, and thus cannot be emitted out from the transparent medium layer 21.

Figure 2:
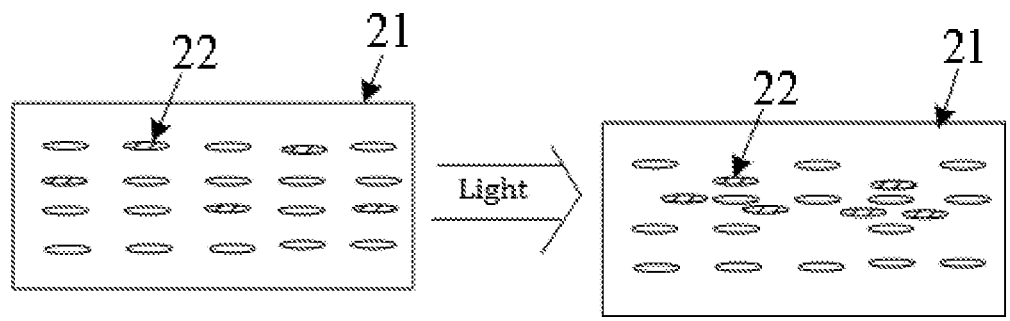
FIG. 2 shows a diagram depicting the effect of photosensitive polymeric monomers subjected to a polymerization reaction provided by an embodiment of the present disclosure.

When no light is provided, the photosensitive polymeric monomers 22 are distributed in the transparent medium layer 21, while with the action of light, the photosensitive polymeric monomers 22 will be subjected to a polymerization reaction. For example, referring to FIG. 2 which shows a diagram depicting the effect of photosensitive polymeric monomers subjected to a polymerization reaction provided by an embodiment of the present disclosure, after being provided with light, the photosensitive polymeric monomers 22 in the transparent medium layer 21 may move around and some adjacent photosensitive polymeric monomers 22 may be polymerized together. This process is referred to as a polymerization reaction of the photosensitive polymeric monomers 22. Photosensitive polymeric monomers 22 subjected to the polymerization reaction would form an interlaced network structure in the transparent medium layer 21. When light illuminates the network structure, the network structure can scatter the light, so that the total reflection of the light in the transparent medium layer 21 is destroyed, thereby enabling the light to be emitted out from the transparent medium layer 21.

Figure 3:
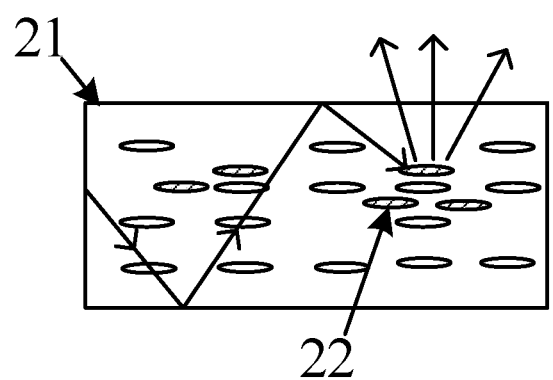
FIG. 3 shows a diagram depicting the path of light transmitted in a diffusion particle layer according to an embodiment of the present disclosure.

Exemplarily, referring to FIG. 3 which shows an diagram depicting the path of light transmitted in a diffusion particle layer according to an embodiment of the present disclosure, when the light is incident into the transparent medium layer 21 from at least one side surface of the diffusion particle layer, the light may be subjected to total reflection by the top and bottom surfaces of the transparent medium layer 21. When the light passes through the photosensitive polymeric monomers 22, the photosensitive polymeric monomers 22 react to polymerize. The light can be scattered by the polymerized photosensitive polymeric monomers 22 and then the scattered light can be emitted out from the transparent medium layer 21.

In the embodiments of the present disclosure, the transparent medium layer 21 in the diffusion particle layer 20 may function as a light guide plat and the photosensitive polymeric monomers 22 doped in the transparent medium layer 21 may function as the netted dots in the light guide plate. In this case, as both the transparent medium layer 21 and the photosensitive polymeric monomers 22 can transmit light, the whole display panel can have a higher light transmittance.

In summary, the display panel provided in the embodiments of the present disclosure includes the diffusion particle layer as well as the color filtering layer and the liquid crystal layer which are stacked on the diffusion particle layer. The diffusion particle layer includes the transparent medium layer and the photosensitive polymeric monomers doped in the transparent medium layer, and a side surface of the transparent medium layer is the light incident surface. The photosensitive polymeric monomers are subjected to the polymerization reaction under the action of the light incident from the light incident surface into the transparent medium layer, and the photosensitive polymeric monomers subjected to the polymerization reaction are configured to scatter the light. In this way, it is not necessary to additionally provide a diffusion sheet, solving the problem that a structure of a display panel is relatively complicated and simplifying the structure of the display panel.

In some embodiments of the present disclosure, the material of the transparent medium layer 21 includes polymethyl methacrylate or polyimide. Optionally, the material of the photosensitive polymeric monomers 22 includes any one of a salicylate material, a benzophenone material, a benzotriazole material, a substituted-acrylonitrile material, a triazine material, and a hindered-amine material.

Figure 4:
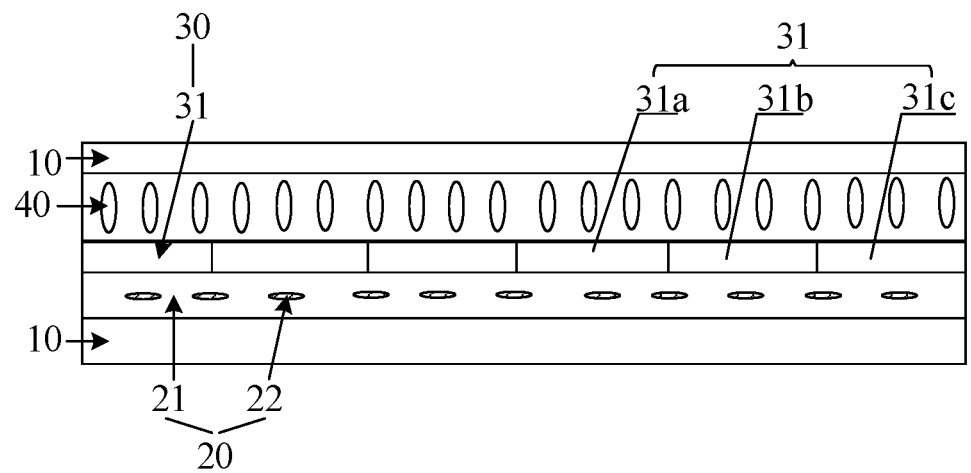
FIG. 4 shows a schematic structural diagram of another display panel provided by an embodiment of the present disclosure.

Optionally, the material of the color filtering layer 30 in the display panel may include resin. Referring to FIG. 4, which shows a schematic structural diagram of another display panel provided by an embodiment of the present disclosure. In the embodiment of the present disclosure, the display panel has a plurality of sub-pixel regions arranged in an array; and the color filtering layer 30 includes a plurality of color filtering blocks 31 located in the plurality of sub-pixel regions with a one-to-one correspondence. That is, in each sub-pixel region, a corresponding color filtering block 31 is disposed. Among the plurality of sub-pixel regions, every three sub-pixel regions constitute one pixel region. For example, each pixel region may include a red sub-pixel region, a green sub-pixel region, and a blue sub-pixel region. As such, a red color filtering block 31a is arranged in the red sub-pixel region; a green color filtering block 31b is arranged in the green sub-pixel region; and a blue color filtering block 31c is arranged in the blue sub-pixel region. The material of the red color filtering block 31a may include red resin; the material of the green color filtering block 31b may include green resin; and the material of the blue color filtering block 31c may include blue resin. Optionally, a transparent substrate 10 may be arranged outside each of the diffusion particle layer 20 and the liquid crystal layer 40. The two transparent substrates 10 can protect an internal structure of the display panel.

Figure 5:
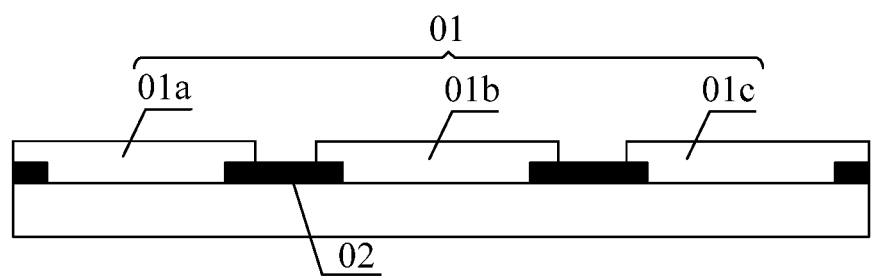
FIG. 5 shows a schematic structural diagram of a color film substrate.

A liquid crystal display panel may include an array substrate, a color film substrate, and a liquid crystal layer located between the array substrate and the color film substrate. Referring to FIG. 5, which shows a schematic structural diagram of a color film substrate, the color film substrate has a color light filter 01. The color light filter 01 may include a red light filter 01a, a green light filter 01b, and a blue light filter 01c. To prevent cross color of the display panel, a black matrix 02 needs to be arranged between every two adjacent light filters. Because the color light filters have a higher light absorption rate and black matrix 02 occupies a larger area (generally, the area of the black matrix 02 accounts for about 40% of the display area of a display panel), the light emission efficiency of an existing liquid crystal display panel (the light emission efficiency can be approximated as a ratio of a brightness of light emitted from the front surface of the display panel to a brightness of light emitted from a light source of the display panel) is relatively lower, resulting in a poorer display effect and greater power consumption of the liquid crystal display panel.

In the embodiments of the present disclosure, as the light absorption rate of the resin is smaller relative to that of the color light filters, the light emission efficiency of the display panel can be improved.

In addition, the display panel may have no black matrix disposed therein, as such, the light emission efficiency of the display panel can be further improved.

Figure 6:
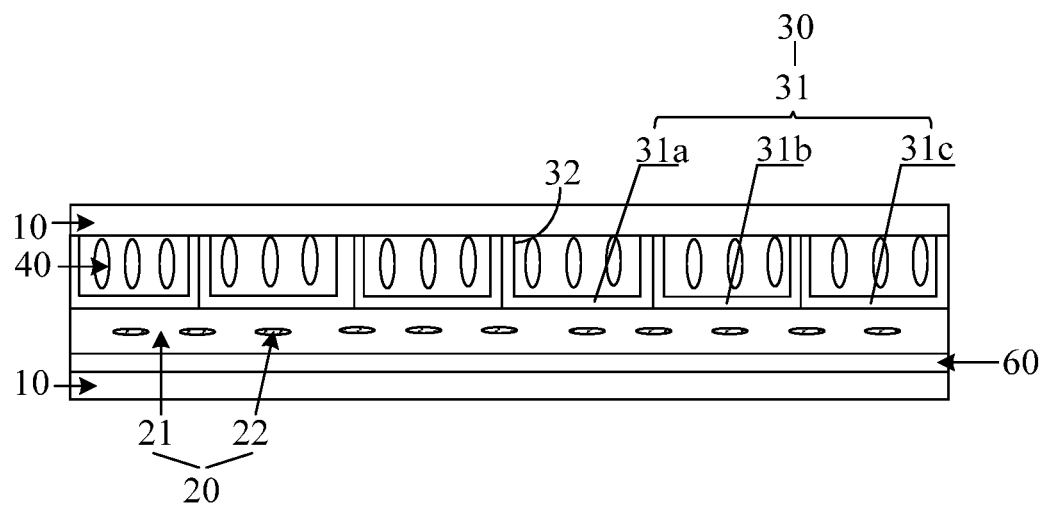
FIG. 6 shows a schematic structural diagram of yet another display panel provided by an embodiment of the present disclosure.

When there is no black matrix, in order to prevent cross color of the display panel, the embodiments of the present disclosure provide an implementable manner as shown in FIG. 6. FIG. 6 shows a schematic structural diagram of another display panel provided by an embodiment of the present disclosure. In this display panel, a color filtering layer 30 is arranged between a diffusion particle layer 20 and a liquid crystal layer 40. That is, the diffusion particle layer 20, the color filtering layer 30 and the liquid crystal layer 40 are sequentially stacked. In the color filtering layer 30, a groove 32 is formed in each color filtering block 31. The liquid crystal layer 40 includes liquid crystal arranged in the groove 32.

In the embodiments of the present disclosure, the liquid crystal in each of the sub-pixel regions can be covered with resin. In such structure, colored light in adjacent sub-pixel regions would not have the cross color problem. Exemplarily, when light passes through a red color filtering block 31a, it is emitted out from the side surface of the red color filtering block 31a. Then, the output red light will be absorbed by the side surface of an adjacent color filtering block (i.e., the green color filtering block 31b or the blue color filtering block 31c), so that the cross color of light in the liquid crystal layer of the display panel can be effectively prevented.

Optionally, as there is no black matrix in the display panel, any two adjacent color filtering blocks 31 may be abutted against each other. In this case, after being emitted out from the side surface of the color filtering block, all the light will be absorbed by the side surface of the adjacent color filtering blocks, so that the cross color of the light in the liquid crystal layer of the display panel can be further prevented.

Figure 7:
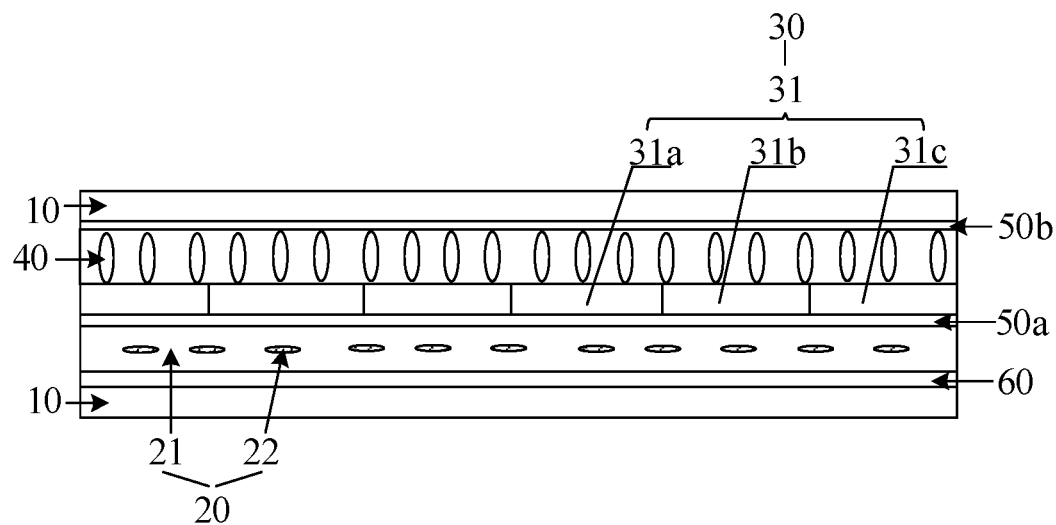
FIG. 7 shows a schematic structural diagram of still another display panel provided by an embodiment of the present disclosure.

As shown in FIG. 7, FIG. 7 shows a schematic structural diagram of another display panel provided by an embodiment of the present disclosure. In the display panel, a diffusion particle layer 20, a color filtering layer 30, and a liquid crystal layer 40 may be sequentially stacked; or a diffusion particle layer 20, a liquid crystal layer 40, and a color filtering layer 30 may be sequentially stacked. It should be noted that FIG. 7 presents a schematic illustration by taking an example in which the diffusion particle layer 20, the color filtering layer 30, and the liquid crystal layer 40 are sequentially stacked. The display panel may further include two polarizers (a first polarizer 50a and a second polarizer 50b); and the color filtering layer 30 and the liquid crystal layer 40 are located between the first polarizer 50a and the second polarizer 50b.

Optionally, the display panel may be a normally-transparent display panel. A normally-transparent display panel is a display panel that is in a light-transparent state when no power is supplied. Thus, the overall light-transmittance performance of the display panel can be further improved. In the normally-transparent display panel, a polarization direction of the first polarizer 50a is perpendicular to that of the second polarizer 50b, and the liquid crystal in the liquid crystal layer can invert the phase of the light by 90 degrees when no power is supplied. In this way, the light emitted from the light source can pass through the two polarizers and the liquid crystal layer.

Optionally, the density of the photosensitive polymeric monomers 21 at a certain position of the diffusion particle layer 20 may be positively correlated with the distance between this position and the light incident surface. That is, the farther the position from the light incident surface is, the denser the photosensitive polymeric monomers are. When the light incident surface includes two opposite side surfaces of the transparent medium layer, from one light incident surface to the other light incident surface, the density of the photosensitive polymeric monomers may be increased first and then decreased. Such structure ensures that light can be transmitted uniformly in the diffusion particle layer, thereby improving the uniformity of the light emitted out from the display panel.

As shown in FIG. 6 or FIG. 7, the display panel may further include: a plurality of thin film transistors (TFTs) 60 arranged in an array on either of the two substrates 10.

Figure 8:
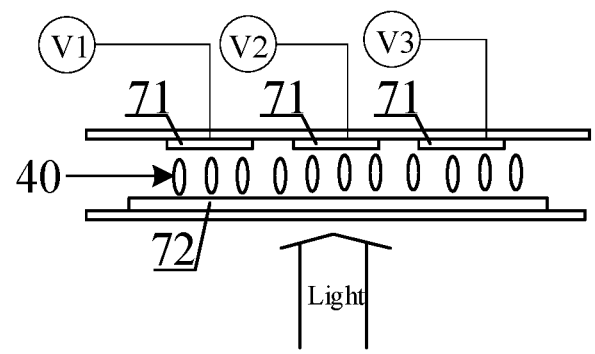
FIG. 8 shows a diagram depicting the principle of controlled display of a display panel provided by an embodiment of the present disclosure.

In the embodiments of the present disclosure, a TFT is arranged in each sub-pixel region; and a pixel electrode and a common electrode are further arranged in the sub-pixel region. As shown in FIG. 8, which shows a schematic diagram depicting the principle for controlling the display of a display panel provided by an embodiment of the present disclosure, a liquid crystal layer 40 in the display panel is located between the pixel electrodes 71 and the common electrode 72. In each sub-pixel region, the TFT is connected to the pixel electrodes 71, and has a switch-on or switch-off state. When the TFT is in the switch-on state, electrical signals of different voltages can be applied onto each pixel electrodes 71, so that the pixel electrodes 71 and the common electrode 72 can form different voltage differences that deflect the liquid crystals by different degrees. Thus, the light transmittances through the liquid crystals in respective sub-pixel regions are different, thereby enabling the display panel to display a colored image.

Figure 9:
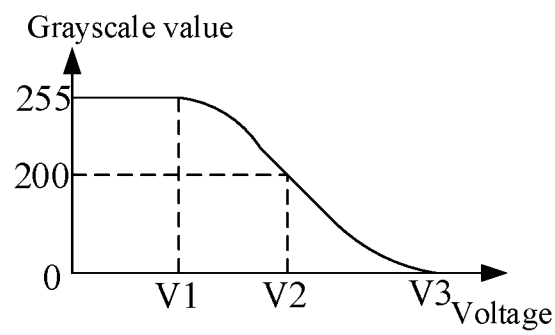
FIG. 9 shows a curve graph between voltages applied onto pixel electrodes and grayscale values of pixels corresponding to the pixel electrodes according to an embodiment of the present disclosure.

Exemplarily, generally, an electric signal having a voltage value of 0 is applied onto the common electrode 72. If an electric signal having a voltage value of V1 is applied onto a pixel electrode 71, a voltage difference of V1 is formed between the pixel electrode 71 and the common electrode 72, and a light transmittance at the liquid crystal between the pixel electrode 71 and the common electrode 72 is the largest. At this time, the grayscale value of the pixel corresponding to the pixel electrode 71 is 255. Similarly, if an electric signal having a voltage value of V2 is applied onto a pixel electrode 71, the grayscale value of the pixel corresponding to the pixel electrode 71 is 200. If an electric signal having a voltage value of V3 is applied to a pixel electrode 71, the grayscale value of the pixel corresponding to the pixel electrode 71 is 0. A corresponding relationship between the voltages applied onto the pixel electrodes 71 and the grayscale values of the pixels corresponding to the pixel electrodes 71 is as shown in FIG. 9. It can be seen that the voltage is negatively correlated with the grayscale value. The greater the voltage is, the smaller the grayscale value is.

In summary, the display panel provided in the embodiments of the present disclosure include the diffusion particle layer as well as the color filtering layer and the liquid crystal layer which are stacked on the diffusion particle layer. The diffusion particle layer includes the transparent medium layer and the photosensitive polymeric monomers doped in the transparent medium layer, and a side surface of the transparent medium layer is the light incident surface. The photosensitive polymeric monomers are subjected to the polymerization reaction under the action of the light incident from the light incident surface into the transparent medium layer, and the photosensitive polymeric monomers subjected to the polymerization reaction are configured to scatter the light. In this way, it is not necessary to additionally provide a diffusion sheet, solving a problem that a structure of a display panel is relatively complicated and simplifying the structure of the display panel.

In addition, as both the transparent medium layer and the photosensitive polymeric monomers in the display panel are transparent, no netted dot is arranged on the transparent medium layer, and the display panel can be disposed without any black matrix, the overall light transmittance of the display panel can be higher. Thus, not only is the power consumption of the display panel reduced, but also the display panel is endowed with a transparency function.

Figure 10:
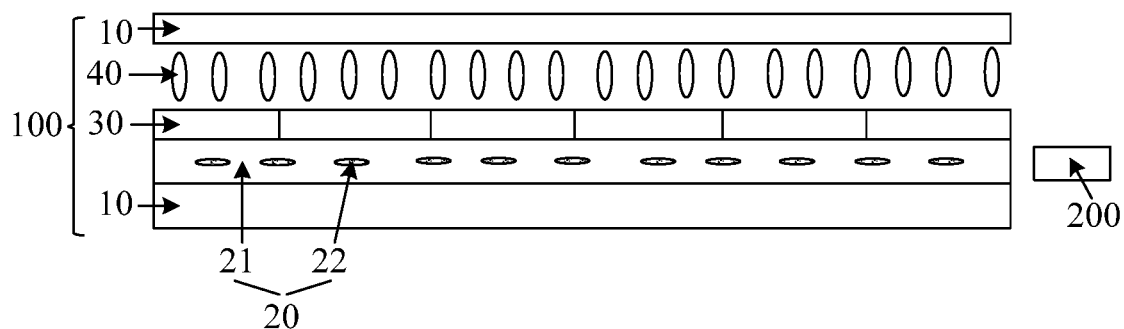
FIG. 10 shows a schematic structural diagram of a display device according to an embodiment of the present disclosure.

The embodiments of the present disclosure further provide a display device. As shown in FIG. 10, which is a schematic structural diagram of a display device provided by an embodiment of the present disclosure, the display device includes a display panel 100 and a light source 200. The display panel 100 may be the display panel shown in FIG. 1, FIG. 4, FIG. 6, or FIG. 7. The light source 200 is located at at least one side surface of the diffusion particle layer 20. The light emitted from the light source 200 can enter the diffusion particle layer 20 from the at least one side surface. That is, the at least one side surface is a light incident surface.

In the embodiments of the present invention, the density of the photosensitive polymeric monomers at a certain position of the diffusion particle layer is positively correlated with the distance between a light source (or the light incident surface) close to the position and the position. Thus, the uniform transmission of light in the diffusion particle layer can be ensured, thereby improving the brightness uniformity of the display device.

Figure 11:
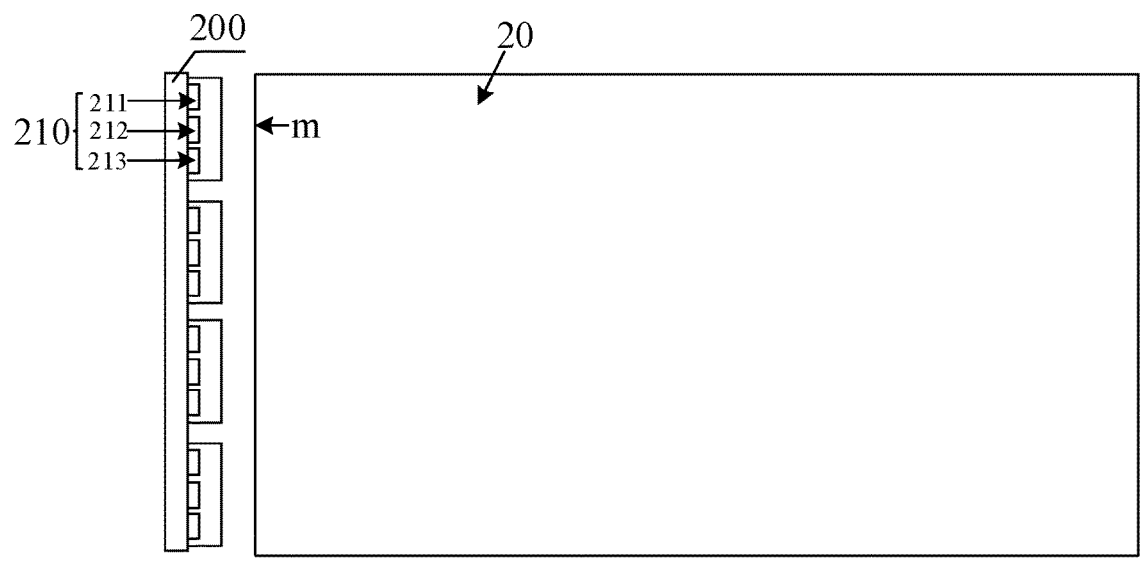
FIG. 11 shows a top view of a display device provided by an embodiment of the present disclosure.

Exemplarily, when the light source is located at one side surface of the diffusion particle layer, as shown in FIG. 11, which shows a top view of a display device provided by an embodiment of the present disclosure, a density of photosensitive polymeric monomers at a certain position of a diffusion particle layer 20 increases as a distance between the position and the light source 200 (or the light incident surface m) increases.

Figure 12:
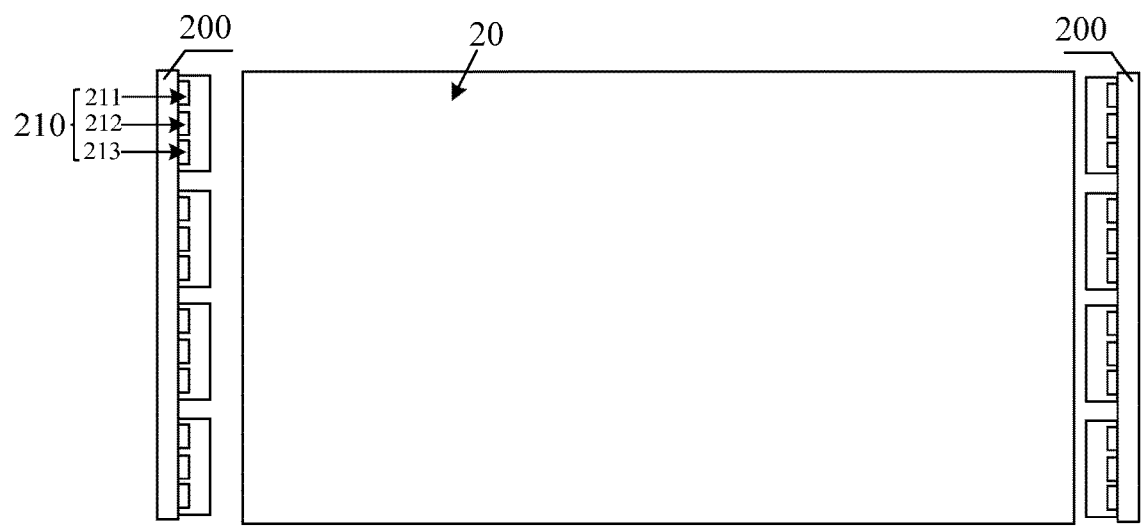
FIG. 12 shows a top view of another display device according to an embodiment of the present disclosure.

When there are two light sources located at two side surfaces of the diffusion particle layer, as shown in FIG. 12 which is a top view of another display device provided by an embodiment of the present disclosure, the light sources 200 are located at positions close to the two opposite side surfaces of the diffusion particle layer 20, respectively. The density of the photosensitive polymeric monomers in the diffusion particle layer 20 close to the light sources 200 is smaller than that of the photosensitive polymeric monomers located at the central region of the light diffusion layer 20.

As shown in FIG. 11 and FIG. 12, a light source 200 includes a plurality of light-emitting diodes (LEDs) 210, each of which includes a red light-emitting unit 211, a green light-emitting unit 212, and a blue light-emitting unit 213. The LED 210 in the display device can drive any one of the light-emitting units in the LED 210 to emit light separately, or can drive all of the light-emitting units in the LED 210 to emit light simultaneously. When all of the light-emitting units therein are driven by the LED 210 to emit light, the LED 210 would emit white light.

If the display device only needs to display an image with one color, the LED 210 can drive the light-emitting units of the corresponding color to emit light. For example, when the display device needs to display a red image, the LED 210 only needs to drive the red light-emitting units 211 in the LED 210 to emit light, so that power consumption of the display device can be further reduced.

The embodiments of the present disclosure further provide a method for manufacturing a display panel. The method is configured to manufacture the display panel shown in FIG. 1. The method may include the following steps:

providing a diffusion particle layer, wherein the diffusion particle layer includes a transparent medium layer and photosensitive polymeric monomers doped in the transparent medium layer, and a side surface of the transparent medium layer is the light incident surface;

stacking a color filtering layer and a liquid crystal layer on the diffusion particle layer.

The photosensitive polymeric monomers are subjected to the polymerization reaction under the action of the light incident from the light incident surface into the transparent medium layer, and the photosensitive polymeric monomers subjected to the polymerization reaction are configured to scatter the light.

Figure 13:
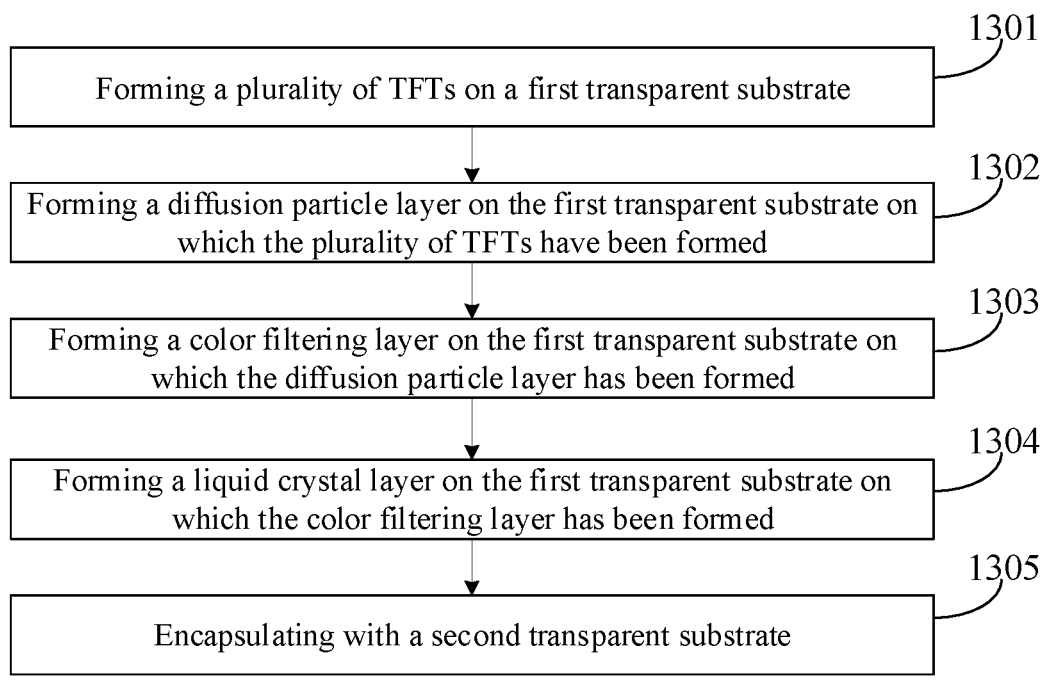
FIG. 13 shows a flowchart of a method for manufacturing a display panel provided by an embodiment of the present disclosure.

Referring to FIG. 13, which shows a flowchart of a method for manufacturing a display panel provided by an embodiment of the present disclosure, the method is configured to manufacture the display panel shown in FIG. 6, and may include the following steps.

In step 1301, a plurality of TFTs are formed on a first transparent substrate.

In the embodiments of the present disclosure, the first transparent substrate has a plurality of sub-pixel regions; and at least one TFT may be formed in each of the sub-pixel regions.

In step 1302, a diffusion particle layer is formed on the first transparent substrate on which the plurality of TFTs have been formed.

In the embodiments of the present disclosure, a transparent medium layer may be formed on the first transparent substrate on which the plurality of TFTs have been formed, and photosensitive polymeric monomers may be doped in the transparent medium layer by using a doping process, so as to form the diffusion particle layer.

Optionally, the plurality of TFTs may also be located on the first transparent substrate on which the diffusion particle layer is formed, which is not limited in the embodiment of the present disclosure.

In step 1303, a color filtering layer is formed on the first transparent substrate on which the diffusion particle layer has been formed.

In the embodiments of the present disclosure, the material of the color filtering layer may include resin. First, the diffusion particle layer may be coated with a red resin layer, and a red color filtering block with a groove is formed in each of red sub-pixel regions of the display panel by a one-step patterning process. Second, the red color filtering blocks are coated with a green resin layer, and a green color filtering block with a groove is formed in each of green sub-pixel regions of the display panel by a one-step patterning process. At last, the green color filtering blocks are coated with a blue resin layer, and a blue color filtering block with a groove is formed in each of blue sub-pixel regions of the display panel by a one-step patterning process. The one-step patterning process includes: coating a photoresist, exposing, developing, etching, and peeling off the photoresist.

In step 1304, a liquid crystal layer is formed on the first transparent substrate on which the color filtering layer has been formed.

Exemplarily, the groove in each of the color filtering blocks may be filled with liquid crystal to form the liquid crystal layer on the color filtering layer.

In step 1305, a second transparent substrate is adopted for encapsulation.

In the embodiments of the present disclosure, the second transparent substrate may be adopted to encapsulate the liquid crystal to prevent the liquid crystal from flowing out of the display panel.

Figure 14:
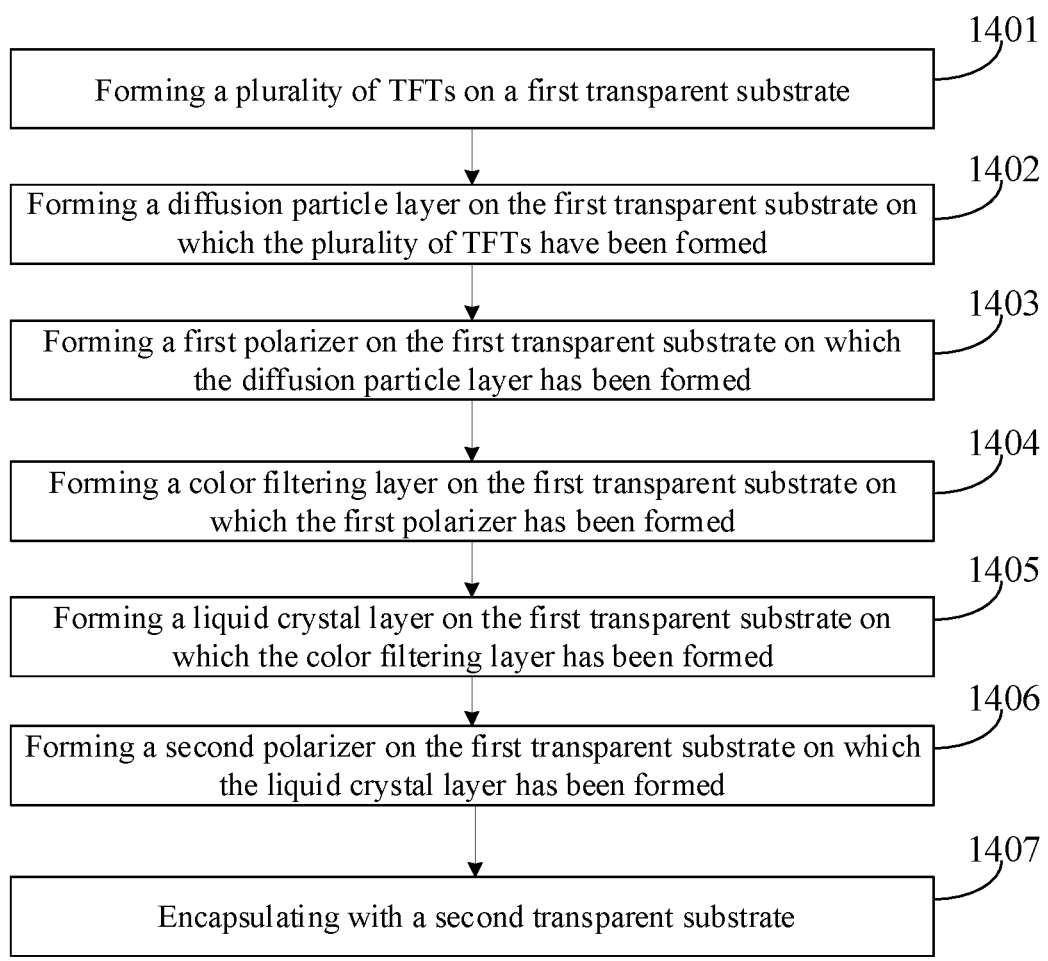
FIG. 14 shows a flowchart of another method for manufacturing a display panel according to an embodiment of the present disclosure.

Referring to FIG. 14 which shows a flowchart of another method for manufacturing a display panel provided by an embodiment of the present disclosure, the method is configured to manufacture the display panel shown in FIG. 7, and may include the following steps.

In step 1401, a plurality of TFTs are formed on a first transparent substrate.

The process in step 1401 may refer to the corresponding process in the above step 1301, and is not repeated in this embodiment of the present disclosure.

In step 1402, a diffusion particle layer is formed on the first transparent substrate on which the plurality of TFTs have been formed.

The process in step 1402 may refer to the corresponding process in the above step 1302, and is not repeated in this embodiment of the present disclosure.

In step 1403, a first polarizer is formed on the first transparent substrate on which the diffusion particle layer has been formed.

Exemplarily, the first polarizer may be formed on the diffusion particle layer.

In step 1404, a color filtering layer is formed on the first transparent substrate on which the first polarizer has been formed.

In the embodiments of the present disclosure, the material of the color filtering layer may include resin. First, the diffusion particle layer may be coated with a red resin layer, and a red color filtering block is formed in each of red sub-pixel regions of the display panel by using a one-step patterning process. Second, the red color filtering blocks are coated with a green resin layer, and a green color filtering block is formed in each of green sub-pixel regions of the display panel by using the one-step patterning process. At last, the green color filtering blocks are coated with a blue resin layer, and a blue color filtering block is formed in each of blue sub-pixel regions of the display panel by using the one-step patterning process. The one-step patterning process includes: coating a photoresist, exposing, developing, etching, and peeling off the photoresist.

In step 1405, a liquid crystal layer is formed on the first transparent substrate on which the color filtering layer has been formed.

Exemplarily, the color filtering layer may be filled with liquid crystal.

In step 1406, a second polarizer is formed on the first transparent substrate on which the liquid crystal layer has been formed.

Exemplarily, the second polarizer may be formed on the liquid crystal layer. Optionally, a polarization direction of the second polarizer is perpendicular to that of the first polarizer.

In step 1407, a second transparent substrate is adopted for encapsulation.

The process in step 1407 may refer to the corresponding process in the above step 1305, and is not repeated in this embodiment of the present disclosure.

Persons of ordinary skill in the art can clearly understand that for the sake of convenient and brief description, a working principle of the display panel described above may refer to the foregoing embodiments showing the structure of the display panel, and details are not repeated herein.

In summary, the display panel manufactured by the manufacturing method thereof provided by the embodiments of the present disclosure includes the diffusion particle layer as well as the color filtering layer and the liquid crystal layer which are stacked on the diffusion particle layer. The diffusion particle layer includes the transparent medium layer and the photosensitive polymeric monomers doped in the transparent medium layer, and a side surface of the transparent medium layer is the light incident surface. The photosensitive polymeric monomers are subjected to the polymerization reaction under the action of the light incident from the light incident surface into the transparent medium layer, and the photosensitive polymeric monomers subjected to the polymerization reaction are configured to scatter the light. In this way, it is not necessary to additionally provide a diffusion sheet, solving a problem that a structure of a display panel is relatively complicated and simplifying the structure of the display panel.

Persons of ordinary skill in the art can understand that all or parts of the steps described in the above embodiments can be implemented through hardware, or through relevant hardware instructed by applications stored in a non-transitory computer readable storage medium, such as a read-only memory, a disk or a CD, etc.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A display panel, comprising:
   a diffusion particle layer, a color filtering layer and a liquid crystal layer, the color filtering layer and the liquid crystal layer being stacked on the diffusion particle layer, wherein
   the diffusion particle layer comprises a transparent medium layer and photosensitive polymeric monomers doped in the transparent medium layer; at least one side surface other than two largest surfaces of the transparent medium layer is a light incident surface; and
   the photosensitive polymeric monomers are subjected to a polymerization reaction under an action of light incident from the light incident surface into the transparent medium layer, and the photosensitive polymeric monomers subjected to the polymerization reaction are configured to scatter the light; and
   wherein a density of the photosensitive polymeric monomers at any position of the diffusion particle layer is positively correlated with a distance between the position and the light incident surface; and
   wherein the display panel has a plurality of sub-pixel regions arranged in an array, the color filtering layer comprises a plurality of color filtering blocks located within the plurality of sub-pixel regions with a one-to-one correspondence, each of the color filtering blocks has a groove, any two adjacent color filtering blocks are abutted against each other, and liquid crystal of the liquid crystal layer is located in the groove and is covered by a color filtering block.

2. The display panel of claim 1, wherein a material of the photosensitive polymeric monomers comprises any one selected from a group consisting of a salicylate material, a benzophenone material, a benzotriazole material, a substituted-acrylonitrile material, a triazine material, and a hindered-amine material.

3. The display panel of claim 1, wherein the color filtering layer is located between the diffusion particle layer and the liquid crystal layer;
   or, the color filtering layer is located on a surface of the liquid crystal layer away from the diffusion particle layer.

4. The display panel of claim 1, wherein a material of the color filtering layer comprises resin.

5. The display panel of claim 1, comprising two polarizers, wherein the liquid crystal layer and the color filtering layer are located between the two polarizers.

6. The display panel of claim 5, wherein the display panel is a normally-transparent display panel.

7. The display panel of claim 1, wherein a material of the transparent medium layer comprises polymethyl methacrylate or polyimide.

8. The display panel of claim 1, wherein a material of the photosensitive polymeric monomers comprises any one selected from a group consisting of a salicylate material, a benzophenone material, a benzotriazole material, a substituted-acrylonitrile material, a triazine material, and a hindered-amine material;
   the color filtering layer is located between the diffusion particle layer and the liquid crystal layer,
   or, the color filtering layer is located on a surface of the liquid crystal layer away from the diffusion particle layer;
   a material of the color filtering layer comprises resin;
   the display panel comprises two polarizers, and the liquid crystal layer and the diffusion particle layer are located between the two polarizers;
   the display panel is a normally-transparent display panel; and
   a material of the transparent medium layer comprises polymethyl methacrylate or polyimide.

9. A display device, comprising a display panel and a light source, the display panel comprising a diffusion particle layer as well as a color filtering layer and a liquid crystal layer which are stacked on the diffusion particle layer, wherein
   the diffusion particle layer comprises a transparent medium layer and photosensitive polymeric monomers doped in the transparent medium layer; at least one side surface other than two largest surfaces of the transparent medium layer is a light incident surface; and
   the photosensitive polymeric monomers are subjected to a polymerization reaction under an action of light incident from the light incident surface into the transparent medium layer, and the photosensitive polymeric monomers subjected to the polymerization reaction are configured to scatter the light,
   the light source is located at the light incident surface; and
   wherein a density of the photosensitive polymeric monomers at any position of the diffusion particle layer is positively correlated with a distance between the position and the light incident surface; and
   wherein the display panel has a plurality of sub-pixel regions arranged in an array, the color filtering layer comprises a plurality of color filtering blocks located within the plurality of sub-pixel regions with a one-to-one correspondence, each of the color filtering blocks has a groove, any two adjacent color filtering blocks are abutted against each other, and liquid crystal of the liquid crystal layer is located in the groove and is covered by a color filtering block.

10. The display device of claim 9, wherein the light source comprises a plurality of light-emitting diodes; and each of the light-emitting diodes comprises a red light-emitting unit, a green light-emitting unit, and a blue light-emitting unit.

11. A method for manufacturing a display panel, comprising:
providing a diffusion particle layer, wherein the diffusion particle layer comprises a transparent medium layer and photosensitive polymeric monomers doped in the transparent medium layer, and a side surface other than two largest surfaces of the transparent medium layer is a light incident surface; and
stacking a color filtering layer and a liquid crystal layer on the diffusion particle layer, wherein the photosensitive polymeric monomers are subjected to a polymerization reaction under an action of light incident from the light incident surface into the transparent medium layer, and the photosensitive polymeric monomers subjected to the polymerization reaction are configured to scatter the light; and wherein a density of the photosensitive polymeric monomers at any position of the diffusion particle layer is positively correlated with a distance between the position and the light incident surface; and wherein the display panel has a plurality of sub-pixel regions arranged in an array, the color filtering layer comprises a plurality of color filtering blocks located within the plurality of sub-pixel regions with a one-to-one correspondence, each of the color filtering blocks has a groove, any two adjacent color filtering blocks are abutted against each other, and liquid crystal of the liquid crystal layer is located in the groove and is covered by a color filtering block.

* * * * *